United States Patent
Bellingkrodt et al.

(10) Patent No.: US 10,366,845 B2
(45) Date of Patent: Jul. 30, 2019

(54) MONITORED ADAPTABLE EMERGENCY OFF-SWITCH

(71) Applicant: PILZ GMBH & CO. KG, Ostfildern (DE)

(72) Inventors: Martin Bellingkrodt, Ostfildern (DE); Christoph Zinser, Ostfildern (DE); Christoph Weishaar, Ostfildern (DE); Helge Peters, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 134 days.

(21) Appl. No.: 15/455,164

(22) Filed: Mar. 10, 2017

(65) Prior Publication Data

US 2017/0186564 A1    Jun. 29, 2017

Related U.S. Application Data (63) Continuation of application No. PCT/EP2015/070588, filed on Sep. 9, 2015.

(30) Foreign Application Priority Data

Sep. 11, 2014    (DE) .................. 10 2014 113 135

(51) Int. Cl.
*H01H 3/02*    (2006.01)
*G05B 19/02*    (2006.01)
(Continued)

(52) U.S. Cl.
CPC ............. *H01H 3/022* (2013.01); *G05B 19/02* (2013.01); *G05B 23/0291* (2013.01); *H01H 9/161* (2013.01); *H01H 47/002* (2013.01)

(58) Field of Classification Search
CPC ...... H01H 3/022; H01H 9/161; H01H 47/002; G05B 19/02; G05B 23/0291
(Continued)

(56) References Cited

U.S. PATENT DOCUMENTS

2015/0029154 A1    1/2015    Lee

FOREIGN PATENT DOCUMENTS

| DE | 199 19 012 | 11/2000 |
|----|------------|---------|
| DE | 203 05 818 | 6/2003 |

(Continued)

OTHER PUBLICATIONS

International Search Report for Appl'n. No. PCT/EP2015/070588; dated Nov. 19, 2015; 2 pp.
(Continued)

*Primary Examiner* — Carlos Amaya
(74) *Attorney, Agent, or Firm* — Harness, Dickey & Pierce, P.L.C.

(57) ABSTRACT

An emergency off-switch for triggering an emergency switch-off function has an actuator and two electrical contact points that can be disconnected from one another by the actuator. The emergency off-switch has an active operating state in which the emergency switch-off function can be triggered by moving the actuator, and a passive operating state in which the emergency off-switch is functionless. The emergency off-switch further has a visualization unit having at least a first and a second display state. The emergency off-switch is visually highlighted in the first display state, and the emergency off-switch is neutrally represented in the second display state. The visualization unit adopts the first display state in the active operating state and adopts the second display state in the passive operating state. The emergency off-switch also has a monitoring unit which monitors whether the visualization unit is in the first or in the second display state.

7 Claims, 3 Drawing Sheets

(51) Int. Cl.
*H01H 9/16* (2006.01)
*G05B 23/02* (2006.01)
*H01H 47/00* (2006.01)

(58) Field of Classification Search
USPC .......................................................... 307/131
See application file for complete search history.

(56) References Cited

FOREIGN PATENT DOCUMENTS

| | | |
|---|---|---|
| DE | 103 44 385 | 5/2005 |
| DE | 10 2006 029 067 | 1/2008 |
| DE | 10 2006 058 708 | 6/2008 |
| DE | 20 2011 104 176 | 10/2011 |
| JP | 2011-197859 | 10/2011 |

OTHER PUBLICATIONS

English translation of International Preliminary Report on Patentability (Chapter 1) for PCT/EP2015/070588; dated Mar. 23, 2017; 10 pp.

MONITORED ADAPTABLE EMERGENCY OFF-SWITCH

CROSS-REFERENCES TO RELATED APPLICATIONS

This application is a continuation of international patent application PCT/EP2015/070588 filed on Sep. 9, 2015 designating the U.S., which international patent application claims priority from German patent application DE 10 2014 113 135.5 filed on Sep. 11, 2014. The entire contents of these priority applications are incorporated herein by reference.

BACKGROUND OF THE INVENTION

The present invention relates to an emergency off-switching arrangement and to an emergency off-switch for triggering an emergency switch-off function for a safety-related shutdown of an electrical device.

Emergency off-switches in terms of the present invention are used to enable an electrical device, such as an electrical machine, an industrial production plant or an electrical supply device, to be selectively shut down in case of an emergency or a dangerous situation. For this purpose, the emergency off-switches usually have an actuator which is red in color, most commonly a push-button, which is arranged against a yellow background, for example a yellow housing part. Due to the widespread shape of the actuating element at least in the past, such emergency off-switches are sometimes referred to as mushroom buttons.

For complex machine systems with several emergency off-switches or for systems with a mobile control unit which is detachable from a machine, adaptable emergency off-switches are increasingly desired. 'Adaptable' in this context means the ability for certain applications to put the emergency off-switch into an inactive state, in which it does not exercise its intended emergency switch-off function. An example of such an application is that of mobile programming panels for industrial robots, which are connected to a robot only during the programming stage and must be fitted with an emergency off-switch in accordance with relevant safety standards (ISO 13849-1). Once such a panel is no longer connected to the robot, it can usually no longer trigger the emergency switch-off function. It goes without saying that in such a case, the emergency off-switch must no longer be represented as such, as otherwise a user is lulled into a false sense of safety.

As an approach to this problem, DE 199 19 012 A1 discloses an emergency off-command device which in the de-energized state, i.e. in a state in which there is no connection to a plant or machine, appears neutral in color, and so is not perceived as an emergency off-switch. But as soon as a connection is made to a machine and an emergency switching-off function can be triggered via the emergency off-command device, the emergency off-command device assumes its characteristic coloring. For this purpose the emergency off-command device comprises, e.g., a transparent or translucent housing, which can be illuminated by means of colored lighting elements, such as color LEDs. With the activation of the command unit, the lighting elements are switched on and the emergency off-command device appears in a standard-compliant coloring.

As an alternative to the active illumination of the adaptable emergency off-switch, DE 103 44 385 A1 discloses another adaptable emergency off-switch, which in a rest position has the previously mentioned characteristic coloring and on being disabled via a passivation element, can be displayed in a visually neutral manner. Thus, for example, an LCD or TFT display on the housing of the emergency off-switch can cover the signal colors of the housing in the passive state. The advantage of this variant is that the emergency off-switch in the active state is not dependent on active illumination.

In both of the above variants, i.e. regardless of whether the emergency off-switch is actively illuminated or actively covered, there is a risk that the respective optical change fails to occur due to a fault. In other words, it may occur that an inactive emergency off-switch is displayed as active, or an active emergency off-switch is displayed as passive. It goes without saying that an incorrectly displayed emergency off-switch is associated with a significant safety hazard.

SUMMARY OF THE INVENTION

Against this background, an object of the present invention is to provide an emergency off-switch that provides a higher level of safety, can be easily implemented and easily integrated into existing applications.

In accordance with one aspect of the present invention, there is provided an emergency off-switching arrangement for safety-related shutdown of an electrical device which is connected to a power supply, the arrangement comprising an emergency off-switch for manually triggering an emergency switch-off function, the emergency off-switch being arranged on a mobile operating panel that can selectively be connected to the electrical device, and a programmable safety controller configured for disconnecting the electrical device from the power supply in response to the emergency off-switch, wherein the emergency off-switch has a housing accommodating at least one current path from a first connection terminal to a second connection terminal, a hand-operated actuator moveably arranged on the housing, and a contact bridge operationally coupled to the actuator such that the at least one current path is interrupted in response to manually actuating the actuator, wherein the emergency off-switch further has LED elements configured for selectively illuminating at least one of the actuator and the housing, wherein the at least one of the actuator and the housing appears colored in a first display state of the LED elements, and wherein the at least one of the actuator and the housing appears neutral in a second display state of the LED elements, and a monitoring circuit for monitoring whether the LED elements are in the first display state or in the second display state, wherein the monitoring circuit monitors a current to the LED elements.

According to another aspect, there is provided an emergency off-switch for triggering an emergency switch-off function for safety-related shutdown of an electrical device, the emergency off-switch comprising a housing accommodating at least one current path from a first connection terminal to a second connection terminal, comprising a hand-operated actuator moveably arranged on the housing, comprising a contact bridge operationally coupled to the actuator, comprising at least two electrical contact points which are electrically connected to one another by the contact bridge in a first actuation state of the actuator and which are selectively disconnected in response to manually actuating the actuator, comprising LED elements configured for selectively illuminating at least one of the actuator and the housing, wherein the at least one of the actuator and the housing appears colored in a first display state of the LED elements, and wherein the at least one of the actuator and the housing appears neutral in a second display state of the LED elements, and comprising a monitoring circuit for monitoring whether the LED elements are in the first display state or in the second display state while the actuator is in the first actuation state, wherein the monitoring circuit monitors a current to the LED elements.

According to yet another aspect, there is provided an emergency off-switch for triggering an emergency switch-off function for safety-related shutdown of an electrical device, comprising an actuator and at least two electrical contact points which can be connected to one another via a contact bridge, wherein a position of the contact bridge is influenced by the actuator such that the electrical contact points can selectively be opened or closed, comprising an active operating state, in which the emergency switch-off function can be triggered by moving the contact bridge, and a passive operating state, in which the emergency off-switch is non-functional, comprising a visualization unit having at least a first and a second display state, wherein the emergency off-switch is visually highlighted in the first display state, and the emergency off-switch is neutrally displayed in the second display state, the visualization unit being designed to adopt the first display state in the active operating state and to adopt the second display state in the passive operating state, and comprising a monitoring unit which monitors whether the visualization unit is in the first or in the second display state, in order to trigger an action in dependence thereof.

It is an idea of the present invention to equip an adaptable emergency off-switch with a monitoring unit which monitors the actual state of the visualization of the emergency off-switch and, in particular, compares it with the current operating state and triggers an action depending on this monitoring. The adaptable emergency off-switch in this case has at least two states. In an active state, the actuation of the emergency off-switch leads to the triggering of a safety function, while in a passive state the emergency off-switch is non-functional, i.e. the safety function is not triggered even when the emergency off-switch is actuated. In the passive state the emergency off-switch can be actuated, but without thereby triggering a function. The action which can be triggered by the monitoring unit may comprise, for example, shutting down the electrical device or preventing the starting up of this device. In other words, the monitoring unit can, for example, trigger the emergency switch-off function or alternatively, prevent a safe state of the electrical device being displayed by the emergency off-switch.

The monitoring unit therefore ensures that the emergency off-switch is properly displayed according to its operating state. A user of the electrical device can therefore rely on the fact that the emergency off-switch shown as active is in fact exercising the relevant safety function, or that a device can only be used when a corresponding emergency off-switch is visible to the user. In this way, when using adaptive emergency switch-off devices the safety of a user is further increased.

In addition, the monitoring unit according to embodiments of the invention can be easily implemented by existing functions of the emergency off-switch, e.g. the triggering of the emergency switch-off function, being co-used by the monitoring unit. In this way, for example, devices for monitoring the functioning of the emergency off-switch can also be used for monitoring the visualization unit. The novel monitoring unit can therefore be implemented particularly inexpensively.

In a preferred refinement, the visualization unit has a defined nominal current in the first display state, wherein the monitoring unit triggers the emergency switch-off function when an actual current in the visualization unit is less than the defined nominal current.

In this refinement, the monitoring unit is designed as a current monitoring device. This means that an actual current in the visualization unit is determined and compared with a defined nominal value. If the actual current is less than the nominal current, then the emergency switch-off function is triggered. A current monitoring device can be implemented particularly simply and at low cost.

In a further refinement, the monitoring unit is designed as a quiescent current relay with a defined quiescent current and at least one working contact, wherein the action can be triggered via the working contact.

A quiescent current relay is energized in the resting state and its working contact is closed. If the current falls below the defined quiescent current of the relay, the working contact opens automatically. A quiescent current relay is particularly suitable for determining a drop in current and triggering an action automatically in response.

In a further refinement, the monitoring unit comprises a normally open (NO) contact and the electrical contact points of the emergency off-switch form a normally closed (NC) contact, wherein the NC contact and the NO contact are connected in series.

In this design, the two electrical contact points form an NC contact together with the contact bridge, via which NC contact the emergency off-switch can trigger the emergency switch-off function. When operated as intended, i.e. when the emergency off-switch is active, the normally closed contact is closed and the current path between the electrical contact points is closed. A normally open contact in series with the NC contact thus acts as an enabling switch that can be controlled by the monitoring unit. In this way, the existing emergency switch-off function can be easily co-used by the monitoring unit. The monitoring unit is thus very simple to integrate into existing emergency off-switches.

In a further refinement, the emergency off-switch comprises a first and a second current path, wherein the action causes an interruption of the first and/or second current path.

In this refinement, the emergency off-switch is designed as a two-channel device with two separate switching paths. The monitoring unit, e.g. in the form of a current monitoring device, can be implemented particularly simply by one or more relays, wherein one working contact of the relay is arranged in each switching path.

In a particularly preferred refinement, the monitoring unit comprises a first normally open contact in the first current path and a second normally open contact in the second current path, and normally closed contacts that are mechanically coupled to the first and second normally open contacts, wherein the first and second current path can be electrically connected via the normally closed contacts.

In this refinement, the monitoring unit comprises NO and NC contacts, which are mechanically coupled with respect to each other. The NO contacts are arranged in the current paths of the emergency off-switch and the NC contacts connect the current paths. When operated correctly, i.e. when the monitoring unit is active, the NO contacts are closed and the NC contacts are open. Using the additional NC contacts, it is possible to detect errors in the monitoring function by carrying out comparisons between the current paths, such as are performed, for example, by means of a safety switching device for cross-over detection. If the NC contacts are closed due to an error within the monitoring unit, a comparison of the two current paths is always positive, so that it would trigger, for example, a crossover detection. In this way monitoring mechanisms for the emergency off-switch, for example a crossover detection, can also be used particularly advantageously for checking the monitoring unit.

In a further refinement, the visualization unit comprises a further display state when the monitoring unit is non-functional.

In this refinement, the visualization unit can adopt a further display state, which is advantageously used as a diagnostic display, for example if an error is present in the monitoring unit. Using the additional display state, the user can identify whether the monitoring unit is operational or not from the emergency off-switch itself.

It goes without saying that the above-mentioned features and those yet to be explained below can be applied not only in the corresponding specified combination, but also in other combinations or in isolation without departing from the scope of the present invention.

BRIEF DESCRIPTION OF THE DRAWINGS

Exemplary embodiments of the invention are shown in the drawing and are explained in more detail in the following description. In the drawing.

DESCRIPTION OF PREFERRED
EMBODIMENTS

Figure 1:
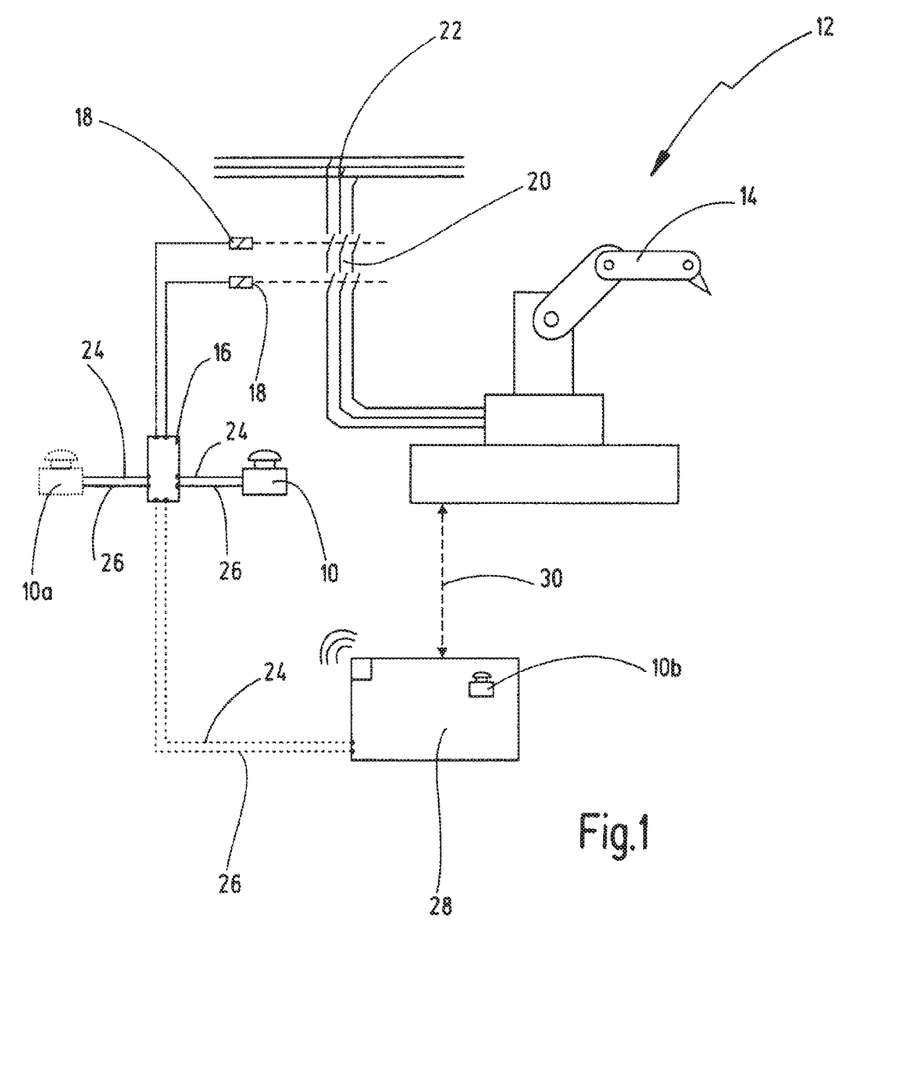
FIG. 1 shows a simplified representation of a preferred application of the novel emergency off-switch.

In FIG. 1, exemplary embodiments of the novel emergency off-switch are designated by reference numerals 10, 10a and 10b.

The emergency off-switches 10, 10a, 10b serve to safeguard a technical system 12, which is indicated here by an automated working robot 14. The robot 14 can present a serious risk to people and property in an uncontrolled state, for which reason an emergency switch-off function is provided, via which the robot 14 can selectively be shut down in an emergency or dangerous situation. In this exemplary embodiment, the emergency switch-off function is established by emergency off-switches 10, 10a, 10b according to embodiments of the invention, a safety switching device 16 and contactors 18, the contacts 20 of which are in series in a power supply path 22 to the robot 14.

The safety switching devices 16 may be a simple safety switching device, a configurable safety switching device or else a programmable safety controller. Such devices are designed to provide for a safe and reliable response in the event of a fault. In the exemplary embodiment shown, this response involves, by way of example, interrupting the power supply path 22 to the robot 14 via the contactors 18, in order thus to de-energize the robot 14. Alternatively, other shut-down options may be used in which a technical system does not necessarily have to be de-energized, but merely transferred into a state which is not dangerous to the user. The emergency switch-off function is usually designed to be multi-channel redundant, as indicated here by the dual design of the contactors 18, for example, and thus ensures that a safe shutdown is possible even in case of a fault in one of the components that contribute to the emergency switch-off function.

On the input side the safety switching device 16 is connected to the emergency off-switches 10, 10a, 10b according to embodiments of the invention. In the present case, the two emergency off-switches with the reference numbers 10 and 10a are wired emergency off-switches, which are connected to the safety switching device 16 via an outgoing conductor line 24 and a return conductor line 26; preferably, these emergency off-switches are arranged on or in the vicinity of the robot 14 so as to be easily accessible to a user.

Reference number 10b designates an emergency off-switch, which is on a mobile operating panel 28 remote from the robot 14 in this exemplary embodiment. The operating panel 28 can be connected to robot 14 via a detachable wired electrical connection 30, wherein the operating panel 28 is coupled with the robot 14 e.g. only during a programming operation. As an alternative to a wired connection 30, a wireless connection may be used and activated or deactivated by a user during a programming operation. The connection of the emergency off-switch 10b to the safety switching device or programmable safety controller may be made physically or logically with outgoing and return signal lines 24, 26. This connection may also be a wired or a wireless connection. It is particularly preferred if the connection of the emergency off-switch 10b is associated with the connection 30 to the robot 14, so that as soon as a connection to the robot 14 is established, the emergency off-switch 10b is also connected to the safety switching device 16.

In order to enable startup of the technical system 12, the contactors 18 have to be closed by the safety switching device 16. For this purpose, the safety switching device 16 repeatedly checks whether a signal passed to the emergency off-switch 10 via the outgoing line 24 arrives back at the safety switching device 16 via the return line 26. If the outgoing signal and the return signal match, or the return signal corresponds to a value expected by the safety switching device 16, the contactors 18 are closed and the technical system 12 can start up. By actuating one of the emergency off-switches 10, 10a, 10b, the current path on the respective conductor pair 24, 26 is interrupted and the contactors are dropped, whereupon the technical system 12 is de-energized in this exemplary embodiment.

It goes without saying that, for safety reasons, the emergency off-switches 10, 10a, 10b should be designed to be easily accessible and clearly visible, and they should be located directly in the field of view of a user in all circumstances. In some cases, such as in cases of interconnected complex technical systems or in the use of mobile emergency off-switches, as shown here by the example of the mobile operating panel 28, there is a requirement of an emergency off-switch being made inactive such that it cannot trigger the previously described emergency switch-off function. An emergency off-switch is inactive when it either cannot or must not trigger the emergency switch-off function. By way of example, such a situation may occur if a first emergency off-switch can shut down only a part of a machine, but due to an interaction of a plurality of machine parts a second emergency off-switch becomes relevant, which second emergency off-switch can switch off the entire system as it is composed at the time. In such a case, the first emergency off-switch should be made inactive, so that a user will select and operate the relevant emergency off-switch in case of an emergency. The emergency off-switches 10, 10a, 10*b* are therefore adaptable emergency off-switches whose appearance may change depending on their state.

By way of example, an inactive emergency off-switch is designated by reference number 10*a* in FIG. 1. The non-functional emergency off-switch 10*a* is displayed as passive to the user, as indicated here by the dashed outline of the emergency off-switch 10*a*. This may be effected in various ways, such as by a light which highlights the emergency off-switch in a standard-compliant color, or by means of a mechanical device that conceals the emergency off-switch during the inactive state, for example. In other words, the standard-compliant appearance of the emergency off-switch is only visible here in the active state. As described in more detail with reference to FIG. 2, an emergency off-switch according to the invention may comprise a checker circuit which, in the event of a change between the active and the inactive state of the emergency off-switch, checks if the display of the emergency off-switch has undergone a corresponding change.

Figure 2:
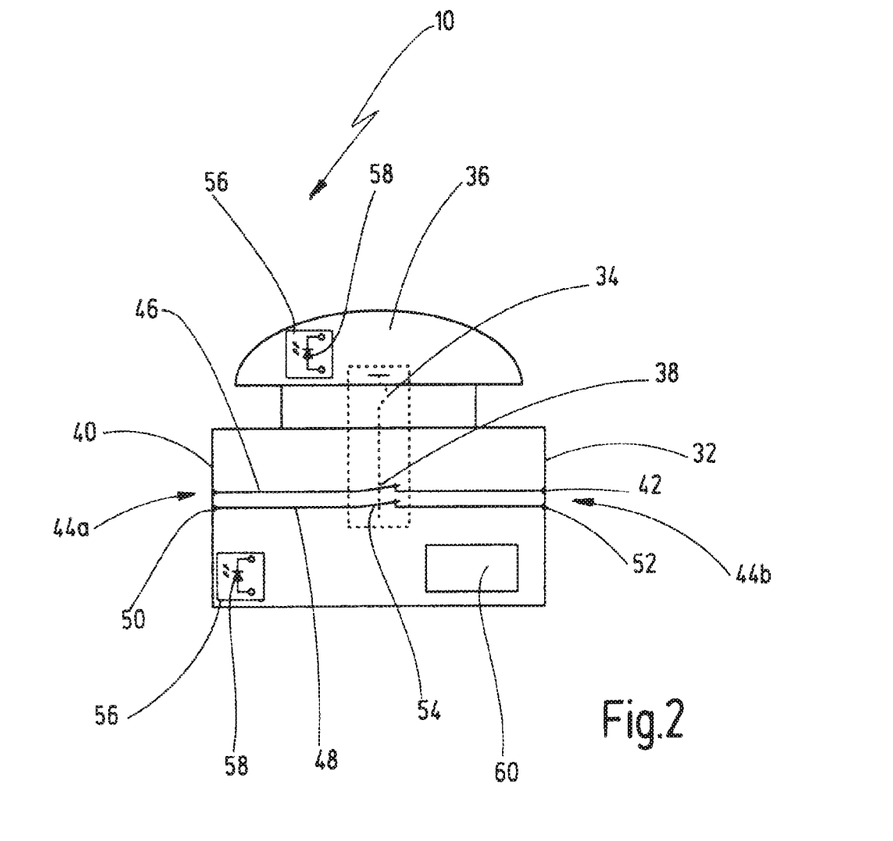
FIG. 2 shows a schematic illustration of an exemplary embodiment of the novel emergency off-switch.

In FIG. 2, a preferred exemplary embodiment of the novel emergency off-switch is designated by reference number 10 in its entirety.

The emergency off-switch 10 of this exemplary embodiment has a housing 32, on which an actuator 34 in the form of a mushroom-shaped button 36 is arranged. Within housing 32 the actuator 34 is connected to a contact bridge 38, which can connect a first electrical contact point 40 and a second electrical contact point 42. The first and second electrical contact points 40, 42 are routed to the outside via connection terminals 44*a*, 44*b* on the housing 32 and can thus be connected to a safety switching device, not shown here, in the manner described above. In a non-actuated state, the contact bridge 38 is closed and the first and the second contact points 40, 42 are electrically connected to each other.

When the actuator 34 is actuated by pressing the button 36, the contact bridge 38 is opened and a current path 46 between the first electrical contact point 40 and the second electrical contact point 42 is interrupted. A signal present at the first terminal 44*a* is therefore no longer looped through to the second terminal 44*b*. The absence of the signal at the second terminal 44*b* enables a safety switching device 16 to detect whether the button 36 has been pressed or not.

As indicated here, emergency off-switch 10 is preferably designed redundantly, i.e. it is equipped with a second current path 48 which can also be interrupted by means of the actuator element 34. The redundant second current path 48 is here established by further first and second electrical contact points 50, 52 and a second contact bridge 54, which is mechanically coupled to the first contact bridge 38.

The emergency off-switch 10 further has a visualization unit 56, by means of which the emergency off-switch 10 can be visually modified. In particular, the visualization unit 56 can adopt a first display state in which the emergency off-switch 10 is displayed in a standard-compliant manner, i.e. with an actuator 34 highlighted in red against a yellow background, as well as a second display state in which the emergency off-switch 10 is hidden or neutrally displayed. In this exemplary embodiment, the visualization unit 56 comprises color LEDs 58, which are arranged within the housing 32. The housing 32 is designed in two parts, with a first housing part as an actuator in the form of a mushroom-shaped button and a second housing part as a base. The housing parts here are fabricated from a transparent or translucent material, so that in the non-illuminated state they appear colorless or in the same color as the background on which they are arranged. When the LEDs 58 are switched off, the emergency off-switch will therefore not be recognized as such. Only when the LEDs 58 are activated does the emergency off-switch 10 adopt its characteristic color appearance, namely by being illuminated by the LEDs 58 in the respective colors. The base is preferably illuminated with yellow LEDs and the actuator with red LEDs.

As an alternative or in addition to an illumination of the emergency off-switch, a visualization unit may also comprise an LCD or TFT display element, for example inside the button or directly on the actuation surface, or obtain an optical modification by a mechanical modification, e.g. by displacing a rubber boot. An LCD or TFT display or a mechanical element have the advantage that the display of the emergency off-switch is not dependent on illumination, and therefore a standard-compliant display is possible without requiring electrical power.

Regardless of the specific implementation, the visualization unit 56 enables the emergency off-switch 10 to be displayed as active or passive. The visualization unit 56 may preferably be coupled with the first connection terminal 44*a* of the emergency off-switch 10, so that a potential at the first connection terminal 44*a*, for example a signal from a connected safety switching device, supplies the visualization unit 56 with power. If no signal from the safety switching device is present at the first connection terminal 44*a*, i.e. the emergency off-switch is not active, then the visualization unit 56 is not energized either and the emergency off-switch 10 is not illuminated. It goes without saying that for a visualization unit 56 which displays an active status in the de-energized state, a corresponding reversal of the preceding logic must be made.

In addition, the emergency off-switch 10 comprises a monitoring unit 60, with which the visualization unit 56 can be monitored. The monitoring unit 60 checks whether the visualization unit 56 is providing the appropriate display corresponding to the state of the emergency off-switch 10. A preferred monitoring unit 60 monitors both for the case that the emergency off-switch 10 is active but displayed as inactive, and the case in which the emergency off-switch is passive but displayed as active. Alternatively, if the two states are mutually exclusive, a monitoring unit 60 may actively monitor only one of these states.

It is particularly preferable that the monitoring unit 60 is coupled with the visualization unit 56 and with the current path 46 between the first electrical contact point 40 and the second electrical contact point 42, and is arranged as a module within housing 32 of the emergency off-switch 10. An alternative arrangement as a separate component outside housing 32 of the emergency off-switch 10 is also contemplated, for example for retrofitting existing emergency off-switches 10.

In a preferred exemplary embodiment, the monitoring unit 60 triggers the emergency switch-off function in the event of a false representation of the visualization unit 56, by interrupting the current path 46, 48 between the first electrical contact point 40, 50 and the second electrical contact point 42, 52. The monitoring unit 60 can thus also trigger the emergency switch-off function in the same way as the actuating element 34. In particular, the monitoring unit 60 ensures that the safety function of the emergency off-switch 10 is active only when the corresponding visualization is also active. The monitoring unit 60 in this example therefore performs an authorization function and prevents a technical system or machine from starting up when the emergency off-switch 10 is not properly displayed during its activation.

As an alternative or in addition, monitoring unit 60 may ensure that the corresponding passive visualization of the emergency off-switch 10 is enabled in the converse case, i.e. if the emergency off-switch 10 is deactivated, in a further exemplary embodiment.

Preferably, the visualization unit 56 can adopt a third display state, by means of which the visualization unit 56 indicates whether the monitoring unit 60 is nonfunctional. For example, the LEDs could flash in the event of a defective monitoring unit 60. As an alternative, when a TFT display is used as a visualization unit 56, the third display state could be displayed as a warning message on the TFT display.

Figure 3:
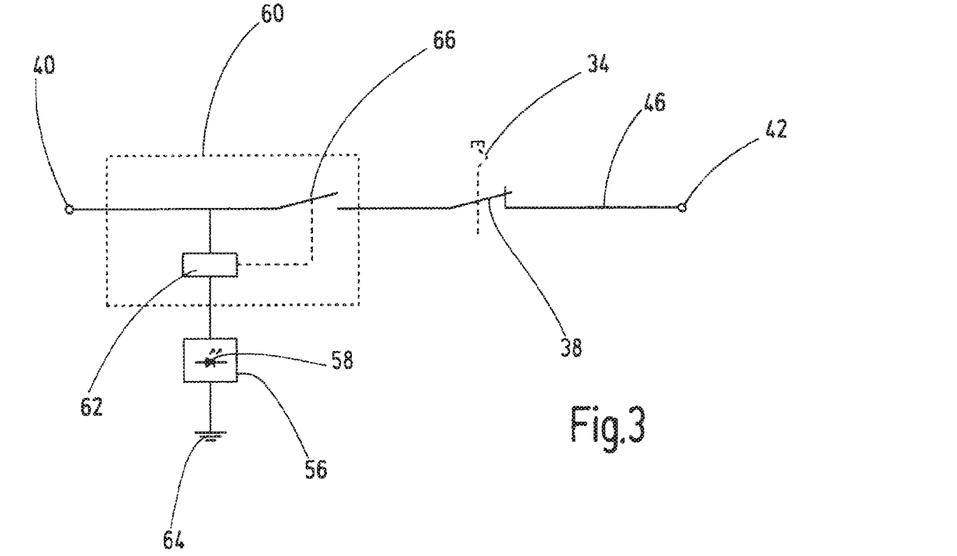
FIG. 3 shows an implementation of an exemplary embodiment of the novel emergency off-switch in a circuit.

An exemplary embodiment of an implementation of the novel emergency off-switch in a circuit with a monitoring unit is explained further with reference to FIG. 3. Identical reference numbers here designate equivalent parts as in the previous exemplary embodiments.

FIG. 3 shows a current path 46 between the first electrical contact point 40 and the second electrical contact point 42. The novel monitoring unit 60 is indicated by the dashed box. The current path 46 leads via two switching elements, firstly contact bridge 38 which is adjustable by means of the actuator 34, and secondly via a working contact of the novel monitoring unit 60.

The monitoring unit 60 is here designed as a current monitoring device with a relay 62. The relay 62 monitors the actual current which flows away from the first electrical contact point 40 via the visualization unit 56 to the ground terminal 64. Relay 62 is preferably designed as a quiescent current relay with a defined quiescent current, with the visualization unit 56 being arranged in a control circuit of the relay 62 and a working contact 66 of the relay being connected in series with the contact bridge 38. If the actual current through the relay 62 is less than the quiescent current, the working contact 66 is opened and current path 46 interrupted.

The actual current in the control circuit of relay 62 corresponds to the actual current through the visualization unit 56. The quiescent current of the relay 62 is selected such that it is equal to a nominal current of the visualization unit 56. If the actual current falls below the nominal current, i.e. the visualization unit 56 is not sufficiently or not properly energized, relay 62 opens the working contact 66 and disconnects current path 46 between the first electrical contact point 40 and the second electrical contact point 42. Due to the series connection, current path 46 is consequently opened, regardless of the position of the actuator 34. In other words, when the visualization unit 56 is not active, a safety switching device 16 connected to the electrical contact 42 cannot enable a technical system 12 which is connected thereto.

Figure 4:
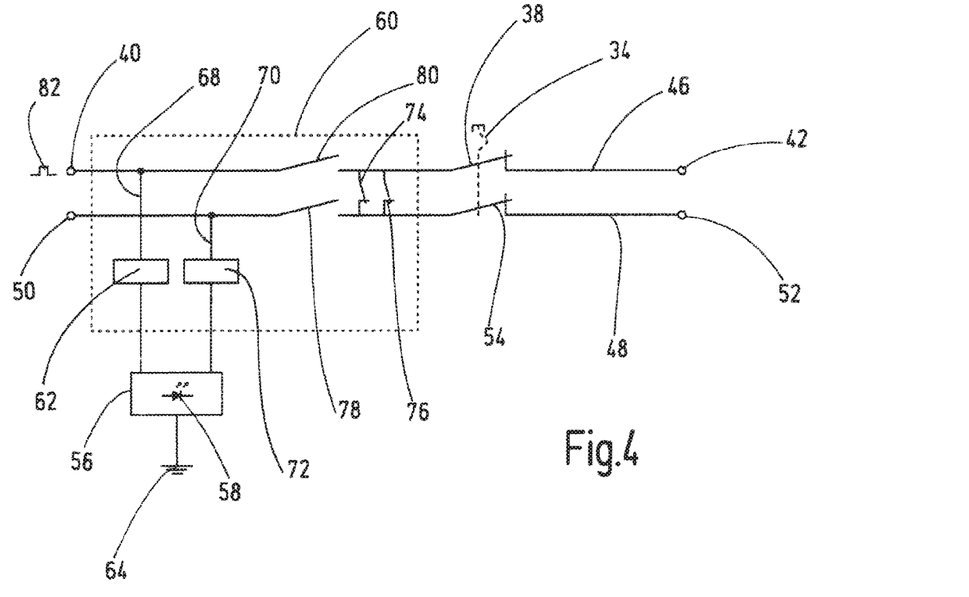
FIG. 4 shows a further implementation of a preferred exemplary embodiment of the novel emergency off-switch in a circuit.

FIG. 4 shows a particularly preferred circuit implementation of the novel monitoring unit 60.

In addition to a first current path 46 between first electrical contact point 40 and second electrical contact point 42, the emergency off-switch 10 further comprises a second current path 48 between a third electrical contact point 50 and a fourth electrical contact point 52. The first and the second current paths 46, 48 each are routed via a respective contact bridge 38, 54, which contact bridges are mechanically coupled with respect to each other and are coupled to the actuator 34. This is therefore an implementation of a two-channel emergency off-switch.

The visualization unit 56 of this exemplary embodiment is fed via a first and a second electrical circuit 68, 70. The first circuit 68 connects connection point 40 to the visualization unit 56 and the ground terminal 64. The second circuit 70 connects the further first electrical connection point 50 to the visualization unit 56 and the ground terminal 64. The visualization unit 56 is shown here as a single unit with LEDs 58. Alternatively, the visualization unit 56 may be formed of a plurality of individual components, for example with a component having yellow LEDs and a component having red LEDs, wherein the first component is connected to the first circuit 68 and the second component is connected to the second circuit 70.

The monitoring unit 60 here further comprises two relays 62, 72, which are each arranged in one of the circuits 68, 70. The relays 62, 72 each are designed with a normally-closed (NC) contact 74, 76 and a normally-open (NO) contact 78, 80 as the working contact. The NO contact 78 of relay 62 is arranged in current path 48 and the NO contact 80 of relay 72 is arranged in current path 46. The NO contacts 78, 80 are therefore crossed in the current paths 46, 48. If one of the relays 62, 72 drops out because the actual current in the particular circuit 68, 70 falls below the quiescent current of the relay 62, 72, then the current path 46, 48, which is not connected to the associated circuit 68, 70, is disconnected. If relay 62 drops out, for example, then current path 48 between the further first contact point 50 and the second electrical contact point 52 is opened.

The normally closed contacts 74, 76 of the relays are arranged in parallel to the first and second current path 46, 48 and connect these together as soon as one of the relays 62, 72 drops out. In other words, in the event of a failure of a relay 62, 72, both the two second electrical contact points 42, 52 are electrically equivalent. In addition, a test signal or pulse 82 can be applied to current path 46, so that in normal operation the current paths 46, 48 have potentials or signals that are different from each other. By equalizing the two current paths 46, 48 using the normally closed contacts 74, 76 in the event of a fault, proper functioning of relays 62, 72 and therefore of the monitoring unit 60 can be verified. For this purpose a safety switching device (not shown here), which may be connected on the output side to the first electrical contact points 40, 50 and on the input side to the second electrical contact points 42, 52, continuously compares the potentials at the second electrical contact points 42, 52 and if appropriate, shuts down a system to be monitored if both potentials, or the signals on both current paths 46, 48, are the same.

Application of different potentials to the individual current paths 46, 48 of a multi-channel emergency off-switch 10, or the single-channel supply of test pulses is in many safety switching devices part of a cross-circuit detection system. Using the crossover detection system, a safety switching device can check whether in the connection lines to an emergency off-switch, which are usually designed as redundant and normally as two cores of a cable, a cross-over has occurred, for example due to bending or crushing of the cable. In accordance with the exemplary embodiment according to FIG. 4, in particular by the use of two relays 62, 72 in the monitoring unit 60 and NC contacts 74, 76 in parallel with the current paths 46, 48, the monitoring unit 60 also can now be tested by means of this already existing cross-over detection system. No separate testing of the monitoring unit 60 is therefore necessary.

Particularly preferably, the result of this testing can be output directly by means of the visualization unit 56, by the visualization unit adopting a third display state.

The novel emergency off-switch in accordance with the exemplary embodiment in FIG. 4 is therefore particularly easy to integrate into existing systems and offers a particularly high level of safety, by the monitoring unit 60 itself being tested for its functioning and any faults present.

What is claimed is:

1. An emergency off-switch for triggering an emergency switch-off function for safety-related shutdown of an electrical device, comprising:
   an actuator and at least two electrical contact points which can be connected to one another via a contact bridge, wherein a position of the contact bridge is influenced by the actuator such that the electrical contact points can selectively be opened or closed,
   an active operating state, in which the emergency switch-off function can be triggered by moving the contact bridge, and a passive operating state, in which the emergency off-switch is non-functional,
   a visualization unit having at least a first and a second display state, wherein the emergency off-switch is visually highlighted in the first display state, and the emergency off-switch is neutrally displayed in the second display state, the visualization unit being designed to adopt the first display state in the active operating state and to adopt the second display state in the passive operating state, and
   a monitoring unit which monitors whether the visualization unit is in the first or in the second display state,
   wherein, in the first display state, the visualization unit has a defined nominal current and the monitoring unit triggers the emergency switch-off function, when an actual current into the visualization unit is less than the defined nominal current.

2. The emergency off-switch of claim 1, wherein the monitoring unit is designed as a quiescent current relay having a defined quiescent current and having a working contact, and the monitoring unit triggers the action via the working contact.

3. The emergency off-switch of claim 1, wherein the monitoring unit has a normally open contact, and the first and second electrical contact points form a normally closed contact, with the normally closed contact and the normally open contact being connected in series.

4. The emergency off-switch of claim 1, further comprising a first and a second current path, wherein the action causes a disconnection of both the first and the second current path.

5. The emergency off-switch of claim 4, wherein the monitoring unit comprises a first normally open contact in the first current path and a second normally open contact in the second current path, and further comprises normally closed contacts that are mechanically coupled to the first and second normally open contacts, wherein the first and the second current path can be electrically connected via the normally closed contacts.

6. The emergency off-switch of claim 1, wherein the visualization unit adopts a third display state when the monitoring unit is non-functional.

7. The emergency off-switch of claim 1, further comprising a connection terminal for receiving a signal from a connected safety switching device, said signal supplying power to the visualization unit.

* * * * *